United States Patent [19]

Maltby et al.

[11] 4,428,026

[45] Jan. 24, 1984

[54] TWO LAYER PROBE

[75] Inventors: Frederick L. Maltby, Jenkintown; Kenneth M. Loewenstern, Warminster; Jack G. Benning, Jr., Lansdale, all of Pa.

[73] Assignee: Drexelbrook Controls, Inc., Horsham, Pa.

[21] Appl. No.: 323,317

[22] Filed: Nov. 20, 1981

Related U.S. Application Data

[62] Division of Ser. No. 72,833, Sep. 6, 1979, Pat. No. 4,301,681.

[51] Int. Cl.³ .................... G01F 23/26; H01G 7/00
[52] U.S. Cl. .................................... 361/280; 73/304 C
[58] Field of Search ............... 361/280, 284, 212, 220; 73/304 C; 324/61 P; 174/106 SC, 102 SC, 140 C

[56] References Cited

U.S. PATENT DOCUMENTS

| 1,536,749 | 5/1925 | Austin | 174/140 C |
|---|---|---|---|
| 2,048,450 | 1/1934 | Horn | 173/13 |
| 2,293,918 | 8/1942 | Planiol | 361/220 |
| 2,955,466 | 12/1955 | Coles | 73/290 |
| 3,049,584 | 2/1959 | D'Ascoli | 174/120 |
| 3,066,180 | 11/1962 | Virsborg | 174/102 SC |
| 3,096,210 | 7/1963 | Boonstra | 117/216 |
| 3,166,688 | 1/1965 | Rowand et al. | 317/2 |
| 3,184,967 | 5/1965 | Rogers | 73/194 |
| 3,339,412 | 10/1965 | Maltby | 73/304 |
| 3,706,980 | 12/1972 | Maltby | 340/244 |
| 3,746,975 | 7/1973 | Maltby | 324/65 |
| 3,831,069 | 8/1974 | Merrell et al. | 361/280 X |
| 3,862,571 | 1/1975 | Vogel | 73/304 C |
| 3,909,507 | 9/1975 | Betts | 174/102 SC |
| 3,988,668 | 10/1976 | Bowers | 324/61 |
| 4,064,753 | 12/1977 | Sun et al. | 73/304 |
| 4,196,464 | 4/1980 | Ruseell | 361/215 |
| 4,235,106 | 11/1980 | Maltby et al. | 73/304 C |

FOREIGN PATENT DOCUMENTS

| 378634 | 8/1932 | United Kingdom . | |
| 530062 | 12/1940 | United Kingdom . | |
| 842039 | 7/1960 | United Kingdom . | |
| 860648 | 2/1961 | United Kingdom | 174/102 SC |
| 1109984 | 4/1968 | United Kingdom . | |
| 1236914 | 6/1971 | United Kingdom . | |
| 1543212 | 3/1979 | United Kingdom . | |

Primary Examiner—Donald A. Griffin
Attorney, Agent, or Firm—Woodcock, Washburn, Kurtz, Mackiewicz & Norris

[57] ABSTRACT

A probe for the measurement of the level of conductive materials within a conductive vessel is disclosed which is particularly suitable for the measurement of the level of conductive granular materials such as coal or other minerals or plastics or vegetable matter which are conductive. In a preferred embodiment the probe comprises a conductive steel core covered with a layer of insulating plastic and covered further with a layer of a semi-conductive material which preferably comprises a plastic which has been partially filled with a conductive material such as carbon black. Other embodiments wherein the probe may comprise a conductive plate covered by insulation further covered by a similar semi-conductive layer are also disclosed. Reference is made to prior art disclosures of circuitry and theory which enable the use of the probe of the invention.

19 Claims, 9 Drawing Figures

TWO LAYER PROBE

This is a division of application Ser. No. 072,833, filed Sept. 6, 1979 now U.S. Pat. No. 4,301,681 which issued on Nov. 24, 1981.

FIELD OF THE INVENTION

This invention relates to measuring the condition of materials. More particularly, this invention relates to the measurement of levels of conductive granular materials. This invention also relates to the detection of the interface between materials having a conductive phase and a semiconductive phase. This invention also relates to the measurement of conductive materials which tend to coat probes.

BACKGROUND OF THE INVENTION

The prior art shows conductive probes for measuring the level of conductive materials within conductive vessels. In general, the prior art shows probes having conductive cores and insulative coatings which are hung vertically within containers typically containing conductive liquids. The insulative coating acts as a dielectric material between the conductive core and the conductive liquid, thus allowing that portion of the insulation which is in the conductive liquid to act as the dielectric of a capacitor. The capacitance between the conductive core of the probe and the conductive vessel within which the conductive liquid is contained is therefore dependent on the depth to which the probe is immersed in the conductive liquid and can be measured, providing a signal proportional to the depth to which the probe is immersed in the conductive liquid. This approach is found in, inter alia, U.S. Pat. Nos. 3,706,980 to Maltby and 4,064,753 to Maltby and Sun, both of which are assigned to the assignee of the present application.

What is not found in the prior art is a method for measuring the level of a conductive granular material within a vessel. It will be appreciated by those skilled in the art that a conductive liquid within which a probe is immersed will tend to form an equipotential surface around the insulative surface of the probe to the depth to which the probe is immersed in the liquid. However, a conductive granular material such as coal, which may be in chunks as large as several inches across, will only contact the insulative coating of the probe at certain points, thus not providing an equipotential surface from which an accurate capacitance may be derived, thus not providing an accurate measurement. Therefore, there has, prior to the present invention, been no accurate means of measuring the level of a conductive granular material within a conductive vessel by means of this capacitance-probe technique. The present invention is designed to solve this problem. In addition, the present invention can be used in the conventional way of measurement of the level of conductive liquids or other nongranular conductive materials. The probe according to the present invention can also be adapted to provide a signal that a conductive granular material is or is not present at the probe rather than a varying signal dependent on the height of the conductive granular material along the probe; or a series of such one-level probes can then be used to determine the level of a granular material within a vessel.

OBJECTS OF THE INVENTION

It is therefore an object of the invention to provide a probe suitable for the measurement of the level of conductive granular materials which will be accurate.

A second object of the invention is to provide a probe for measuring the level of conductive granular materials the accuracy of which is unaffected by particle size.

It is a further object of the invention to provide a probe suitable for measuring the level of conductive granular materials, the accuracy of which is unaffected by wear.

It is a further object of the invention to provide a probe for the measurement of the level of conductive granular materials which is easily installed.

It is a further object of the invention to provide a probe for the measurement of the level of conductive granular materials which is at once simple, rugged, reliable and inexpensive.

Finally, it is a further object of the invention to provide a probe which has a high capacitance for detecting the interface between a conducting material and a semiconducting material, and which satisfies the other objects of the invention and needs of the art mentioned above.

SUMMARY OF THE INVENTION

The probe of the invention satisfies the needs of the art and the objects mentioned above by its provision of a semi-conductive layer over an insulative coating which in turn encases a conductive core. In a preferred embodiment, the core is a standard steel cable, which is flexible and which has an insulative coating of natural polypropylene thermoplastic and a further semi-conductive coating of carbon black-filled polyurethane thermoplastic over that. In this way, a coating is provided which is suitably semi-conductive to provide an essentially equipotential surface when contacted in several places per unit area by a conductive granular material, but which is not so conductive as to render its entire surface an equipotential surface when it is grounded via a conductive granular material.

BRIEF DESCRIPTION OF THE DRAWINGS

The invention will be better understood if reference is made to the accompanying drawings in which.

DETAILED DESCRIPTION OF THE PREFERRED EMBODIMENTS

Figure 1:
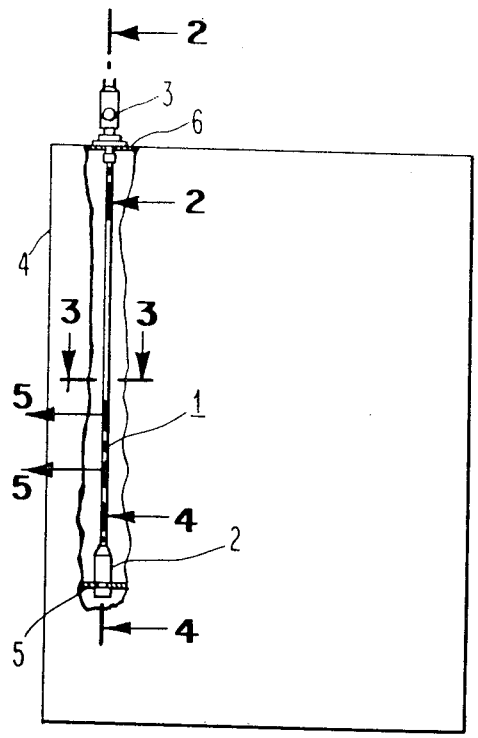
FIG. 1 represents an overall view of the probe of the invention installed in a conductive vessel for the containment of granular materials.

As discussed above, conductive probes have been used in the prior art to measure the level of conductive materials, chiefly liquids. Such systems are disclosed in, for example, U.S. Pat. No. 3,339,412 to Maltby and assigned to the assignee of the present invention. Improvements on the basic concept have been made as well and may be exemplified by the circuitry shown in U.S. Pat. No. 3,706,980 also to Maltby and also assigned to the assignee of the present invention. Other improvements which may also be of utility with the probe of the present invention are found in U.S. Pat. No. 4,064,753 to Sun and Maltby and again assigned to the assignee of the present invention. In each case, the operative principle of the probe is as follows: a conductive core provided with an insulative coating is extended into the conductive material to be measured and the capacitance between the conductive core of the probe and the vessel wall is measured. By comparison with a reference capacitance, a signal may be derived indicating the level of the material within the vessel inasmuch as the capacitance across the probe and vessel is governed by the extent to which a capacitor is formed by the equipotential surface provided on the outside of the insulation (the insulation being the dielectric of the capacitor) and the core within.

Again, as discussed above, this approach is perfectly adequate and workable when the nature of the conductive material the level of which is to be measured is such that it uniformly contacts the insulation of the probe, thus forming an equipotential surface. However, where the material is of a granular solid nature such as coal or various mineral ores which are conductive but which are not of sufficiently small size as to uniformly contact the insulative surface of the probe, an equipotential surface is not formed and therefore the value of the capacitance detected is not an accurate representation of the level of the material within the vessel. Moreover, even if the signalling circuitry were calibrated to accurately measure a specific granular material, any change in size or conductivity of the material would require recalibration.

It might at first blush appear sensible to create an equipotential surface by putting a conductive coating over the insulative coating of the central probe. However, a moment's reflection will show that this is not the solution, because such a conductive surface would be an equipotential surface at all points along the probe and not merely along the areas where the conductive granular material was found. Instead, any contact of the outer surface with the conductive material would give a signal indicating that the vessel was full, thus totally misleading any apparatus or operator utilizing such a signal in other processes. As discussed above, the present invention solves these difficulties by providing a semi-conductive outer layer over the insulative layer which in turn covers the conductive core. The conductivity of the outer layer may be selected so as to provide an essentially equipotential surface over its area where covered by conductive granular material, thus providing one "plate" of a capacitor, the conductive core being the other "plate" and the insulation being a dielectric layer interposed therebetween, thus forming a capacitor. This capacitor may then be used in a balancing circuit of the type previously discussed and thereby used to provide a signal indicative of the level of conductive granular material within a conductive vessel.

Referring now to FIG. 1, an overall view of a vessel 4 cut away to reveal a probe 1 is shown. Such a vessel 4 will ordinarily be provided with conductive inner walls on at least its vertical surfaces whereby a current path may be provided from the walls, which are connected to sensor circuitry, through the conductive granular material, to the surface of the semiconductive outer layer of the probe 1, thus establishing a capacitor across the dielectric insulating layer of the probe. The core of the conductor 1 may be connected to the signal input of the sensor circuitry and used as described above to provide an indication of the level of the conductive granular material within the vessel 4. In a preferred embodiment of probe 1 will be provided with a lower termination 2 and upper termination 3. The lower end 2 may be firmly attached to a shelf 5 within the vessel 4 and the upper termination of the probe 1 may be attached to the upper surface of the vessel 6.

Figure 3:
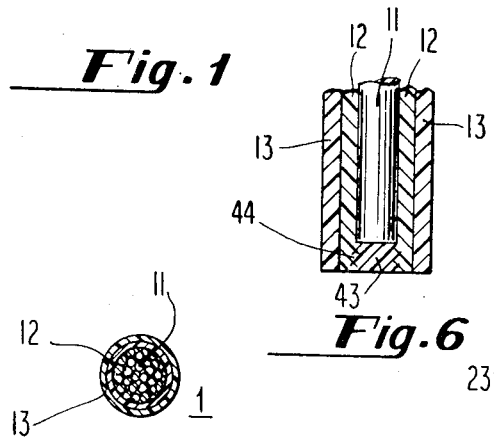
FIG. 3 represents a cross-section of the probe at an intermediate point.

The vessel 4 may be used to contain any sort of granular, or for that matter, liquid, conductive material. It is anticipated, however, that the utility of this probe of the invention will largely be with conductive granular minerals such as coal, iron or other metallic ore and the like, although it is also of use with certain organic materials such as wood chips. In such an application it will ordinarily be desirable that the probe 1 be somewhat flexible so as not to fracture when impacted by the granular materials which may in some cases be quite heavy and be dumped into the vessel 4 at some significant rate of speed thus tending to damage a rigid probe. Also, it is difficult to manufacture, ship, and install rigid probes for tall vessels. Therefore, a preferred embodiment of the invention is as found in cross-section in FIGS. 3 and 5 where a central core 11 comprises an ordinary steel rope. Desirably, this steel rope may be a conventional 7 by 19 GAC stranded cable $\frac{3}{8}''$ (9.5 mm) in diameter. The dielectric is formed by an insulator 12 which may be 1/16" (1.5 mm) thick natural polypropylene thermoplastic, and is covered by a semiconductive layer 13, which may be $\frac{1}{8}''$ (3.0 mm) thick carbon black-filled polyurethane thermoplastic. This last layer 13 is semi-conductive by virtue of being at least partially filled with carbon black material which, as is well known, is a conductive material. In a preferred embodiment, Cabot Co.'s carbon black is used to provide 25% by weight filling, however, dependent on the material being sensed, the filler content may desirably range between 10–50%. The amount of filling, of course, will determine the actual conductivity of the surface layer and as discussed above this may be optimized for dealing with granular materials of various sizes and types, though, in general, it is found that a single amount or quantity of filling is adequate for use with a wide variety of granular materials.

It will be apparent to those skilled in the art that a semi-conductive layer such as 13, while rendering a capacitive type probe useful for measurement of the level of conductive granular materials, may also be used with conductive liquids as were the prior art probes. Additionally, it will be appreciated that the core 11 need not be a stranded metallic rope but could be a solid rod or tube of any conductive material when conditions do not require a somewhat flexible metal rope.

Figure 2:
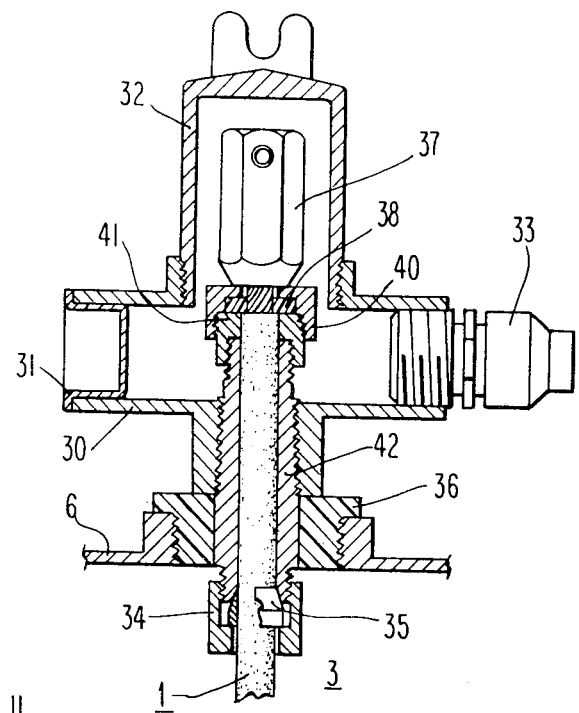
FIG. 2 represents a desired preferred upper end configuration of and mounting means for the probe.

FIG. 2 shows one preferred embodiment of the upper termination 3 of the probe 1. The probe is shown mounted into the upper surface of the vessel 4 at 6, a threaded flange. The probe 1 is shown engaged by a ferrule 35 forced into firm engagement with the probe 1 by the action of a taper on the ferrule 35 and a coacting taper on threaded sleeve member 42, the ferrule 35 being acted upon by threaded plug means 34. When threaded plug means 34 is threaded on to sleeve member 42, it tends to push ferrule 35 upwards into sleeve means 42 thus tightening ferrule 35 about the probe 1. In this way, the outer semi-conductive and the inner insulative layers 13, 12 are clamped to the steel core 11. When such a probe 1 is hung vertically, naturally the weaker plastic coatings will tend to stretch more than the core. Since the coatings are clamped to the core by means of the ferrule 35, they will tend to tighten thereon, in accordance with Poisson's Ratio, thus tending to fully couple themselves to the core both electrically and mechanically. Friction on the outer surface exerted by the material to be measured will further tighten the plastic. It will be understood that the insulating and semi-conducting layers need not be clamped to the core to have these layers tighten on the core in response to force along the probe. The core is a convenient place to clamp both layers simultaneously with one clamp, but self-tightening will occur if the layers are clamped separately or together, to the same member or to different members of the upper termination. Sleeve 42 fits within a threaded steel plug 36 which provides support for the probe 1 in the upper wall 6 of the vessel 4. Sleeve means 42 also engages a housing 30 which encloses an electrical wire (not shown) connecting the probe to the sensor circuitry. This wire may be connected at an end termination 37 which may be connected directly to the central core 11 of the probe 1 by means of a set screw or other contacting means, and be run from end termination 37 to a connector 33; a conventional electrical connector may be used at this point to connect the probe to the sensor circuitry. An upper plug 41 may be used along with end termination 37 to terminate the probe and hold its upper end firmly against the insulative sleeve 40 which insulates the termination 3 of the probe 1 from the upper wall 6 of the vessel 4, thus permitting a capacitor to be formed between the wall of the vessel 4 and the core 11. A second housing 32 may be threaded into housing 30 in order to provide ready access to the connector 37. A plug 31 may be used to close off the end of a conventional fitting used to provide housing 30 which is not used in the embodiment shown. It will be observed that according to the embodiment shown the probe is entirely insulated from the upper wall 6 of the vessel 4 but that the semiconductive layer is in contact with the housing 30. In some embodiments, it may be desirable that this layer not be electrically connected to the upper termination. This may be simply done by any one of a number of expedients well known in the art. One such would be to simply remove the semi-conductive coating 13 from the probe just below the end plug 34 in which case the insulation layer 12 would be in contact with the metallic connecting pieces such as sleeve 42.

Figure 4:
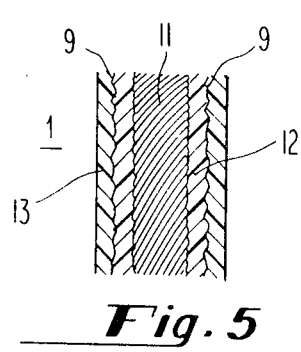
FIG. 4 represents a suitable termination and mounting means for the nether end of the probe.

A preferred lower termination of the probe of the invention in the embodiment shown is shown in FIG. 4. There the probe 1 exemplified by semi-conductive layer 13 is shown terminating in a swaged-in spike 14 which is driven into the lower end of the cable 11 so as to provide a firm, solid termination. This spike 14 is held in place by a metallic end 16 which may be used to brace the bottom end of the probe 1 against a block 23 which in turn fits within an insulative sleeve 17 and plug 20 and which thrusts against insulative plug 22. In this way, the entire termination 2 of the probe 1 is insulated from any metallic members which may used to connect it to the shelf 5. For example, an outer sleeve 18 may be readily engaged with a plug 21 connecting it by means of a bolt 19 to shelf 5. Additional potting material such as epoxy 15 may be used in order to further electrically isolate the probe of the invention from the conductive walls and shelf 5 of the vessel 4. The lower termination may be allowed to hang freely rather than be attached to the vessel as by shelf 5 in FIG. 4. Although an unattached lower termination allows the probe to move with respect to the vessel walls, there is no substantial resulting loss in measurement accuracy because the outer layer of the portion of the probe covered by conductive material is in effect grounded by the conductive material.

It was mentioned above that one of the advantages of using a steel rope for the core of such a double-layered probe is that the core, itself then becomes somewhat flexible. Of course, if the core is to be flexible, so too must the coatings be. This is one advantage of using the polyurethane and polypropylene materials mentioned above. A second reason for using polyurethane for the outer layer is abrasion resistance, as it will be apparent that a probe to be used continually with such materials as coal or mineral ores will be subject to a good deal of abrasion. Polyurethane is quite resistent to abrasion; the addition of carbon to the polyurethane further increases its abrasion resistance.

A second advantage of using a wire rope type of core is that it has corrugations built into it which serve to hold the plastics coatings onto its surface. Double layed wire rope is particularly advantageous because it has its strands wound into bundles in the direction opposite that in which the bundles are wound into rope. This has two merits: first, if the rope is twisted so as to unwind it, the individual bundles get wound tighter, thus opposing the unwinding; second, if insulation is not bonded to the wire rope, the tendency of the insulation to slip down the rope by screw action will be lessened by the individual strands lying across the direction of the screw action. In this connection, the method of fabricating the probe is of some importance. It is necessary that there be no air gaps between the insulation and the probe or between the insulation and the semi-conductive outer layer because these would add an additional variable capacitance to the probe, thus rendering measurement results somewhat inaccurate. Furthermore, it is necessary that the coatings be firmly attached to each other so that good mechanical coupling is obtained thus allowing the strength of the steel rope core to support the outer, somewhat weaker, plastic layers. It has been found that an adequate method of applying the coatings to the rope is by extruding them over the rope in a continuous process, cutting the thus manufactured probe to a desired length and providing it with suitable terminations. Another possibility which might be of utility would be impregnating the insulative coating onto the rope such that the insulation flows into the small interstices between the various wires making up the strands of the rope and then filling the outer layer of this coating with a conductive material such as the carbon black discussed above. Yet another possibility would be to use an outer layer f a material which could be integrally bonded to the insulating layer. The polypropylene insulating layer disclosed above cannot be bonded to the polyurethane semi-conductive layer but it has been found by the inventors of the present probe that this is not necessary for mechanical integrity. As discussed above, clamping the plastic layers to the core and hanging the probe from the clamp tends to cause the plastic layers to tighten on the probe in accordance with Poisson's Ratio.

Figure 5:
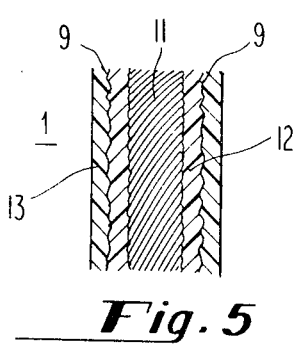
FIG. 5 shows a second cross-section of the probe at an intermediate point.

FIG. 5 shows a further possibility for improving the mechanical and electrical coupling between the layers, by roughening the surface of the insulating layer 12 before applying the semi-conductive layer 13. In this way, the interface 9 will comprise grooves which tend to grip the later applied semi-conductive layer. As discussed above, bonding the two layers together through a heat pressure process may be useful. For example, an inner layer of Teflon may be used to form the insulative layer 12 and may then be enclosed, within a tube of Teflon filled with a conductive material. If one end of the tube is closed, and if the other end of the tube is then exhausted by a vacuum pump while atmospheric pressure and heat are applied to the probe, the semi-conductive outer layer will tend to fit very snugly about the inner layer and bond itself to it due to the presence of the heat, thus providing excellent mechanical and electrical coupling.

It will be apparent to those skilled in the art that the conductivity and the dielectric constant of the two layers applied to the conductive core are important in optimizing the performance and accuracy of measurement of the probe of the invention. The idea is, of course, to saturate the insulating layer; that is, cause the semiconducting layer to be sufficiently conductive so as to provide, when in contact with conductive granular materials, an equipotential surface as one plate of the capacitor, the central core, of course, being the other plate. Saturation occurs when the impedance between the outside of the insulating layer and ground, usually the vessel's walls, is low enough relative to the impedance of the insulating layer that small changes in the impedance between the outside of the insulating layer and ground have little effect on the impedance between probe and ground. In this way, only the insulation impedance of the portion of the probe covered by the material to be measured will be measured. In order to obtain saturation when dealing with materials to be measured which are of low conductivity (i.e. have high impedance) insulation with high impedance (i.e. low capacitance) is used. This may be obtained by use of an insulation with low dielectric constant or by making the ratio of outside to inside diameter of the insulation large. A high-insulation impedance will also be obtained by making the measurement at a low frequency. It has been found by the present inventors that suitable probes for measuring the level of a material such as coal should have an outer layer with conductivity of 0.5 to 2 micromhos/cm, capacitance of approximately 70 picofarads per foot when saturated and used with a frequency of 15 kHz. Such a probe will saturate with a material having a conductivity of 2 micromhos/cm in vessels with typical geometry.

A second consideration is that the outer semi-conducting layer should be thick enough to tolerate abrasion. The thicker it is, the more can be worn away and still allow the probe to function properly. The more conductive this layer is, the better it connects the points of contact with a granular material, thus producing an equipotential surface. However, the more conductive this layer is, the greater the "coating error" produced by it. Coating error, as discussed more fully in U.S. Pat. No. 4,064,753 mentioned above, occurs because the coating is itself somewhat conductive or has a layer of conductive material adhering to it, thus tending to produce an additional current path to ground from an area not within the level of the material to be measured, thus introducing an error into the measurement process. Several means are available for eliminating this coating error. One such is disclosed in U.S. Pat. No. 4,064,753 as discussed above and involves the use of a second electrode the output from which can be compared with the probe electrode thus eliminating the effect of material to be measured adhering to the probe electrode. However, this method is not applicable to the preferred embodiment. This factor may be taken into account by developing 2 signals, one proportional to probe to ground conductance and one proportional to probe to ground susceptance. By subtracting one from the other, an output which is proportional only to the level of the material to be measured is obtained. This is discussed in further detail in U.S. Pat. No. 3,746,975 to Maltby and assigned to the assignee of the present invention, and incorporated herein by reference, at column 10, line 12 through column 11, line 8.

Figure 7A:
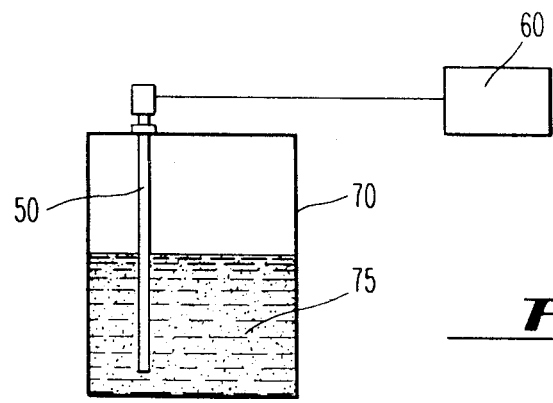
FIGS. 7A-7C show the probe of the invention in use measuring the level of various materials.

It will be appreciated that there has been herein described a probe suitable for measuring the level of conductive materials whether they be large or small granulars or liquids. As shown in the broadest sense in FIG. 7A, the probe 50 is immersed in a material 75 within a vessel 70, and is connected to admittance responsive circuitry 60. It will also be apparent to those skilled in the art that the invention can be used in other forms other than that specifically discussed above. For example, the invention can be used to provide simple on-off signal probes, i.e. probes not extending over a long distance, which will simply indicate the presence or absence of material at a particular level. A series of such probes can be used to provide an indication of a level if they are spaced in a vertical array within a vessel. A second possibility for use of the invention involves applying the invention to other prior art probe techniques such as providing probes sliding within tracks in the walls of vessels. Another possibility involves using a guard shield electrode of the type disclosed in U.S. Pat. No. 4,064,753 discussed above.

Figure 6:
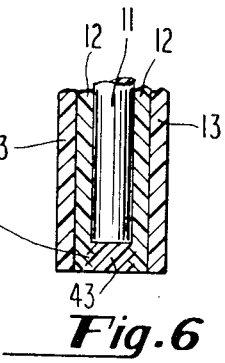
FIG. 6 shows an alternative termination of the nether end of the probe.
Figure 7B:
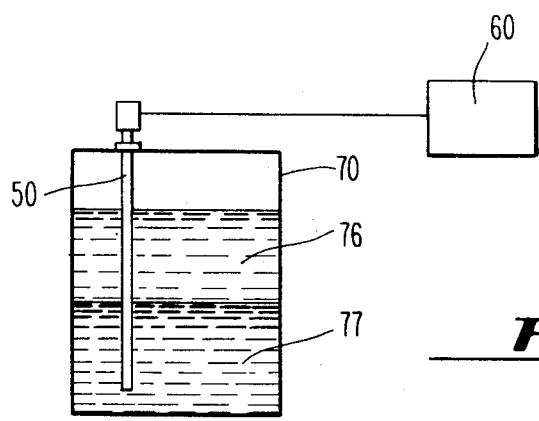

Finally, FIG. 7B show a further application for use of the invention: the measurement of the height of the interface between two immiscible liquids 76 and 77 in a vessel 70. Such a probe 50, connected as above to an admittance responsive circuit 60, to be useful must have an insulation impedance such that it is saturated by one liquid but not by the other. When the interface is between the conductive material and a semi-conducting material, a probe with high insulation capacitance must be used to prevent saturation with the semi-conducting phase. This high insulation capacitance may be obtained by using very thin insulation. Use of a very thin insulation on a conducting core presents the obvious following problems: it is more likely to contain pinholes than a thick insulation, which will admit conductive liquids and ground out the probe, a thin insulation is more fragile than a thick insulation, and if it is partially abraded or eroded, a larger percentage change in saturation capacitance would occur than if thick insulation wore by the same amount. These problems are solved by the use of the two-layer technique disclosed above. The outer semi-conductive layer prevents material from entering pinholes in the inner layer and protects it from damage. Moreover, any wear will occur to the outer layer and thus will have negligible effect on the measurement. The means of making a probe of this type would be the same as disclosed above except that in this case a high insulation capacitance would be used with a high-conductivity outer layer so that the amount of filling of the outer plastic layer and the thickness of the inner layer would be determined by somewhat different criteria, which are, however, well known to the art. A probe of this type would desirably have as its conductive core a metal rod or tube to give constant inside diameter to the insulating inner layer, flexibility usually not being an advantage in the measurement of liquids. Such a probe is desirably terminated at its lower end as shown in FIG. 6, wherein the insulating layer 12 extends beyond the end of the conducting core 11. The resulting space is filled by insulative plug 43, desirably made of the same material as insulating layer 12 so that the joint between insulating layer 12 and plug 43 may be heat-welded. Semi-conducting layer 13 may then be applied over insulating layer 12. Semi-conductive layer 13 may be applied so as to be flush with the lower end of insulating layer 12 as shown or, in a fashion similar to termination of the insulating layer, extended beyond the lower end of insulating layer 12 and plug 43 and the resulting spaced filled with a plug of the same material as semi-conductive layer 13. Or, the insulating layer 12 may be flush with the lower end of conducting core 11 and the semi-conducting layer 13 extended beyond the insulating layer 12 with the resulting space filled with a plug made of the base material of semi-conducting layer 13 (without conductive filler) which is heat-welded to semi-conducting layer 13.

Figure 7C:
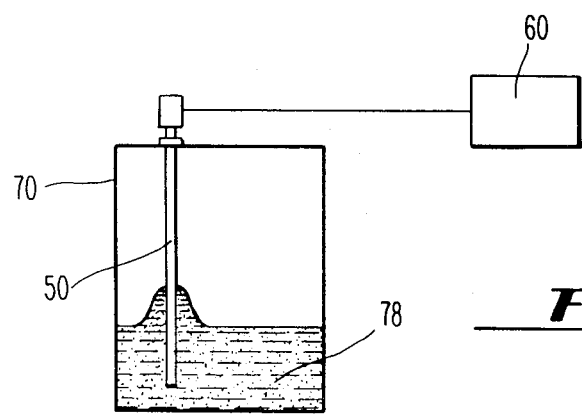

A further use for such a two-layer high capacitance probe is in the measurement of conductive materials such as slurries which tend to leave coatings on a probe. As shown in FIG. 7C, this leads to a false indication of height of the slurry 78 on the probe 50 connected as usual to admittance responsive circuitry 60 for measuring the level of a slurry 78 within a vessel 70. Coatings on a probe have the least effect on a level measurement using the method described in U.S. Pat. No. 3,746,975 when the probe insulation impedance is low. When this low insulation impedance is obtained by use of a thin insulating layer, considerable increase in ruggedness without loss of ability to ignore coatings is obtained by covering the thin insulation with a thicker semi-conducting layer.

Finally, it will be realized that the probe of the invention will function as an ordinary capacitance probe, despite the addition of the semi-conductive layer, for measuring the level of non-conductive materials.

It will be appreciated that apart from the modifications and variations to the inventions disclosed above there will no doubt be others occurring to those skilled in the art. Hence the examples given above should be considered as exemplary only and not as limitations on the scope of the invention which is limited only by that of the following claims.

We claim:

1. A system for measuring the level of conductive materials within a vessel comprising a probe, said probe comprising:
   (a) a conductive core electrode;
   (b) an insulating coating on said core electrode; and
   (c) an outermost continuous semi-conductive coating on said insulating coating;
   whereby said semi-conductive coating becomes an equipotential surface with respect to said core electrode where covered by conductive materials, so that a capacitance exists between said core electrode and the portion of said semi-conductive coating covered by conductive materials;
   a reference capacitance;
   means for comparing the reference capacitance to the capacitance existing between the core electrode and the semi-conductive coating; and
   means for deriving a signal indicative of the level of said conductive materials responsive to said means for comparing.

2. A system for detecting the presence of conductive materials comprising admittance-responsive signal processing circuitry and a probe, said probe comprising an elongate section comprising a central conductive electrode, a continuous insulative coating on said electrode preventing said electrode from contacting said conductive materials and a continuous semi-conductive coating over said insulative coating forming the external surface of said probe whereby said semi-conductive coating becomes an equipotential surface with respect to said electrode where covered by conductive materials, so that a capacitance exists between said semi-conductive coating and said conductive electrode, said circuitry being capable of generating a signal proportional to said capacitance.

3. A system according to either of claims 1 or 2 wherein said electrode is a steel rope.

4. A system according to claim 3 where said insulative coating is impregnated into said rope.

5. A system according to claim 4 wherein the semi-conductive layer is produced by impregnating the surface of said insulative coating which is not in contact with said probe with a conductive filler material.

6. A system according to claim 5 where said filler is carbon black.

7. A system according to either of claims 1 or 2 where said insulative coating is polypropylene.

8. A system according to either claims 1 or 2 where said semi-conductive coating is a carbon black filled polyurethane.

9. A system according to claim 8 where said carbon black comprises between ten and fifty percent of said semi-conductive layer.

10. A probe for the measurement of the level of conductive materials within a vessel having conductive wall portions comprising a probe member, an upper termination and a lower termination, said probe member comprising a conductive core covered by an insulating layer and further covered by an outermost continuous semi-conducting layer, said conductive core being electrically insulated from said conductive materials, said upper termination including means for attachment to said semi-conducting layer so as to provide physical support of said probe while maintaining electrical isolation of said core and said semi-conducting layer from said vessel, said upper termination also including means for electrical connection of said core to an electrical terminal adapted to be connected to sensor circuitry for providing a signal representative of the level of said conductive materials within said vessel, and said lower termination maintaining electrical isolation of said core and of said semi-conductive layer from said vessel.

11. A probe according to claim 10 wherein said core comprises a steel cable.

12. A probe according to claim 10 wherein said insulating layer comprises a plastics material.

13. A probe according to claim 10 wherein said semi-conducting layer comprises a plastic at least partially filled with a conductive material.

14. A probe according to claim 10 wherein said insulating layer comprises a plastics material and said semi-conducting layer comprises a layer of said insulating material which has been filled with a conductive material.

15. A probe according to claim 10 wherein the insulating layer is roughened prior to application of the semi-conductive layer.

16. A probe according to claim 10 wherein the insulating and semi-conductive layers are bonded to one another by means of the simultaneous application of heat and pressure.

17. A probe according to claim 10 wherein said semi-conducting and insulating layers are clamped to said core at said upper termination.

18. A probe according to claim 10 wherein said semi-conducting and insulating layers are clamped at said upper termination.

19. A probe according to claim 10 wherein said lower termination includes means for fastening the lower termination in said vessel, said means for fastening being electrically insulated from said core and said semi-conducting layer.

* * * * *